C. H. DIETZE, Jr.
CANDLE HOLDER.
APPLICATION FILED APR. 23, 1920.
1,350,710.
Patented Aug. 24, 1920.
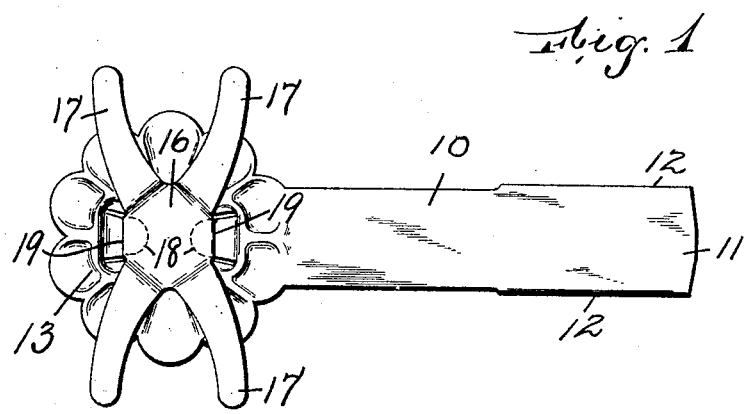
Fig. 1
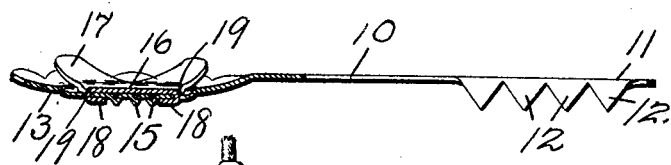
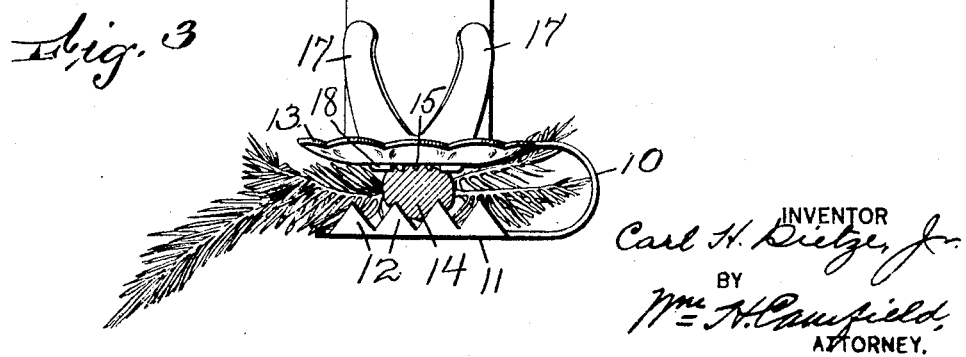
Fig. 2
Fig. 3
INVENTOR
Carl H. Dietze, Jr.
BY
Wm H Caufield
ATTORNEY.

UNITED STATES PATENT OFFICE.

CARL H. DIETZE, JR., OF NEWARK, NEW JERSEY.

CANDLE-HOLDER.

1,350,710. Specification of Letters Patent. Patented Aug. 24, 1920.

Application filed April 23, 1920. Serial No. 375,995.

*To all whom it may concern:*

Be it known that I, CARL H. DIETZE, Jr., a citizen of the United States, and a resident of Newark, county of Essex, and State of New Jersey, have invented certain new and useful Improvements in Candle-Holders, of which the following is a specification.

This invention relates to an improved candle holder for Christmas trees and the like, is one that is secure when in position and is adapted to form a substantially flat structure when not in use, this being brought about by making the device with its grasping portion or member of one piece, which can be formed into position for grasping the limb of a Christmas tree or like projection, and one in which no springs are employed.

The invention is further designed to provide a device which is cheaply made, the assembling thereof being a very simple and easy matter, requiring no insertion of rivets or springs and thus saving time and labor in the manufacture of the device.

The invention is illustrated in the accompanying drawing, in which Figure 1 is a face view of my improved candle holder before any of its parts are bent into grasping position. Fig. 2 is a side view of Fig. 1, with the left hand half thereof shown in section through the center, and Fig. 3 is a side view of the device in position on the limb of a tree and with the candle holding means holding a candle.

The device comprises a strip 10 which is made of easily bendable metal, usually tin, which strip is formed of sufficient length so that when bent over the two opposite ends embrace the limb of a tree, such as the small limb of a Christmas tree. The ends are adapted to be securely fastened, and one form of insuring such fastening is to provide one of the ends, such as the end 11, with serrations on its side edges so that when bent down they form parallel rows of teeth 12, and while one end only may be so serrated, both edges are preferably made this way so as to eliminate any tilting of the device.

The other end is made slightly ornamental and is preferably dished slightly, this dished portion 13 being made slightly concave so that it forms a receptacle for any grease that runs down from the candle. The bottom face of this end coöperates with the toothed portion of the other end, so that when the device is bent over, as in Fig. 3, the branch 14 of a tree is tightly grasped between these two ends, and, if desired, I may provide knurled or knob portions 15 struck up on the bottom face of the dished portion, so that the device does not turn on the branch, it does not tilt and maintains the dished portion in a substantially horizontal position on the top of the branch.

Suitable candle holding means is secured to the upper face of the dished portion, in the form shown this consisting of a sheet of easily bendable metal, such as tin, this sheet having a central portion 16 and having arms 17 which project therefrom, this whole plate being substantially flat, being but slightly dished to conform to the dished portion of the main strip, and being secured preferably by clips 18 which pass down through slits 19 in the strip and when bent over securely hold the two members together.

When the device is to be used, these arms 17 are bent up as shown in Fig. 3, and they are then in position for holding a candle 20. The devices are normally packed and sold in the flat form shown in Figs. 1 and 2, in this way it being possible to place a great many in a small space, compared with the space necessary for packing the kind that are made of two pieces joined together and swinging on a pivot to form a spring clasp.

The assembling of the two parts is easily done and takes but little time, and the cost of producing this form of holder is very low as compared with the cost of assembling the older forms of holder.

I claim:

A candle holder for Christmas trees and the like comprising a strip of easily bendable metal having its side edges at one end serrated and turned down to form parallel rows of outwardly projecting teeth, the other end being dished, the concave side of the dished part being on the opposite side to that from which the teeth project, the dished portion having slits therein, a second piece made of easily bendable metal having projecting arms adapted to lie normally flat and with the major portion of said arms within the dished portion and also adapted to be bent up to form a candle grasping means, said second piece having clips passing through and bent over in the slits of the first piece, the whole device being adapted to be transported and packed in substantially flat form and being bendable into supporting and grasping position when required for use.

In testimony that I claim the foregoing, I have hereto set my hand, this 22nd day of April, 1920.

CARL H. DIETZE, Jr.